United States Patent [19]

Hardy

[11] 4,213,338

[45] Jul. 22, 1980

[54] LIQUID LEVEL INDICATOR

[75] Inventor: Albert L. Hardy, Louisville, Ky.

[73] Assignee: General Electric Company, Louisville, Ky.

[21] Appl. No.: 13,335

[22] Filed: Feb. 21, 1979

[51] Int. Cl.² ............................................. G01F 23/16
[52] U.S. Cl. ...................................... 73/299; 116/227
[58] Field of Search ................. 73/299, 323, 747, 302; 116/227; 134/113; 222/23

[56] References Cited

U.S. PATENT DOCUMENTS

| 2,121,743 | 6/1938 | Oyen | 73/299 |
| 3,127,902 | 4/1964 | Cumming | 134/113 |
| 3,152,723 | 10/1964 | Perl | 222/23 |
| 3,272,011 | 9/1966 | Kendt | 73/299 |
| 3,371,535 | 3/1968 | Martiniak | 73/306 |
| 3,608,514 | 9/1971 | Dunn | 134/113 |

FOREIGN PATENT DOCUMENTS

529413  11/1921  France ........................................ 73/299

*Primary Examiner*—Gerald Goldberg
*Assistant Examiner*—Denis E. Corr
*Attorney, Agent, or Firm*—Bruce A. Yungman; Radford M. Reams

[57] ABSTRACT

An indicator providing a visual indication of the level within a rinse aid dispenser tank for dishwashers, consisting of a U-tube containing an indicator liquid having one leg in communication with the lowermost region of the tank and with the other disposed adjacent a viewing window. Air pressure generated in the connecting tubing by the relative liquid level in the tank acts to control the position of the liquid in the U-tube to provide a level indication at the viewing window. The air column intermediate the tank and the U-tube section is vented each time the door is opened to avoid variations in indication occurring with temperature and atmospheric pressure changes. The indicator liquid is introduced through a fill and drain tube extending from the upper end of the leg into the dispenser tank, such that a calibrated volume of liquid is introduced by flow into the U-tube from the tank and drain back of the excess over the calibrated volume. An anti-siphon tube in communication with the fill and drain tube precludes siphoning of the rinse aid liquid back into the tank as the excess liquid drains back through the fill and drain tube upon closing of the dishwasher door.

9 Claims, 4 Drawing Figures

LIQUID LEVEL INDICATOR

BACKGROUND DISCUSSION

It is often desirable to provide a visual indication of the level of liquid in a tank such as for rinse aid dispenser tanks which are provided in many dishwashers in order to automatically dispense rinse aid liquids during each rinse cycle.

The dispenser tank holds a volume of rinse liquid sufficient for many rinse cycles such that the user is not required to add the rinse and liquid for each use of the machine. Such tanks are typically located within the dishwasher door so as to not be visible from the exterior of the machine and hence a simple sight glass associated directly with the tank is not practical.

U.S. Pat. No. 3,272,011 to Kent et al discloses one such indicator arrangement in which a visual indication is provided of the level of rinse aid liquid contained within the dispenser tank. The visual indicator is located remotely from the tank and is positioned so as to be easily viewed by the dishwasher user.

This particular indicator arrangement comprises a length of tubing extending upwardly from the tank, and in fluid communication with the lower region of the reservoir tank interior and having a reversely curved helical section, a portion of which is positioned adjacent a viewing window. A quantity of indicator fluid is disposed in the curved tube section, and a pressure developed in the tube section by the presence of liquid in the tank causes a displacement of the indicator liquid in correspondence with the level of liquid in the tank. The system is appropriately calibrated such that upon declining of the liquid level in the tank to a near-empty condition, the indicator liquid retreats in the tube section adjacent the viewing window to thus provide an indication of the empty condition of the reservoir tank.

This arrangement is peculiarly adapted to top-loading dishwashers, but most modern dishwasher designs are of the front-loading type, in which the dishwasher door is mounted to the front of the machine and is opened by being swung downwardly to enable the dishware items to be loaded.

Also, the air column trapped within the tube changes in volume with changes in temperature and barometric pressure conditions, such that a difference in indication will occur with changes in these conditions.

In many such front-loading dishwashers, the tank is mounted in the door itself and subjected to the door swinging movement from the closed (vertical) to the open (horizontal) position.

The Kent et al patent employs an indicator liquid differing from the tank liquid which must be added at assembly of the machine. This, of course, adds to the cost of manufacture since the indicating liquid must be supplied at assembly and a calibrated volume of liquid introduced into the indicator system. It would, of course, be advantageous if the need for special indicator liquid could be obviated and a simplified procedure for adding the liquid to the system employed. Since rinse aid liquids are dyed to be readily visible, such liquid could be employed in a liquid indicating system of the general type as disclosed in the Kent et al patent.

In U.S. Pat. No. 3,152,723 to Perl et al there is disclosed a visual indicator for the rinse aid dispenser tank, which is viewable only from the inside of the door, i.e., only when the dishwasher door is in the open position.

Other systems have been proposed for obtaining an indication of the rinse aid detector tank which is directly associated with the tank itself as in the Perl et al device.

It may be considered more convenient to view such a liquid level indicator with the door in the closed position, or at a higher point on the door than that at which the tank is mounted.

Accordingly, it is an object of the present invention to provide a level indication arrangement incorporating the remote indication capability of the Kent et al device, while adapting the same to a front-loading dishwasher or other application in which the tank is movably mounted to be swung between positions which are vertically tilted with respect to each other.

It is a further object of the present invention to provide an arrangement for insuring that barometric pressure and temperature changes do not affect the performance of the indicator device.

It is yet another object of the present invention to provide a liquid level indicator utilizing liquid in which the indicating liquid employed may be the same liquid which is disposed in the dispenser tank and a calibrated volume of which is added to the indicator system by a relatively simple procedure.

It is a further object of the present invention to provide such a liquid level indicator apparatus which is relatively simple and low in cost to manufacture.

SUMMARY OF THE INVENTION

These and other objects of the present invention, which will become apparent upon a reading of the following specification and claims, are achieved by an indicator arrangement consisting of a fluid passage, i.e., an air column tube, in communication with the lowermost region of the tank, with the tank in its first position. The air column is also in communication with a U-tube, positioned vertically with the tank in the first position. A volume of indicator liquid is disposed in the U-tube, and the remote leg of the U-tube is positioned adjacent a viewing gaging means. The level of indicator liquid in the remote leg thereby provides an indication of the liquid level in the tank causing displacement of the indicator liquid disposed in the U-tube. The air column tube is vented upon each movement of the tank to the second position, by draining of the tank liquid back into the tank. The tank in turn being vented, this effects a venting of the air column to the atmosphere to minimize the effects of temperature and barometric pressure shifts.

The terminal end of the indicator leg of the U-tube is placed in fluid communication with the interior of the tank by a pair of tubes, a fill and drain tube and an anti-siphon tube. The fill and drain tube extends into the tank at a level corresponding to the maximum liquid level in the tank, such that the liquid in the tank will flow into the U-tube at initial filling of the tank. Upon movement of the tank back to the first, door closed position, the excess liquid drains into the tank, the anti-siphon tube preventing siphoning out of the remaining liquid in the U-tube.

The terminal portion of the indicator leg of the U-tube is positioned vertically in the tank, in the second, door open position, to preclude the escape of liquid back into the tank as the door is opened and closed. The vertical level of the point at which the fill and drain tube enters the indicator leg of the U-tube is such that a calibrated volume of tank liquid is introduced to properly relate the level of liquid in the tank to the position of liquid in the indicator section.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
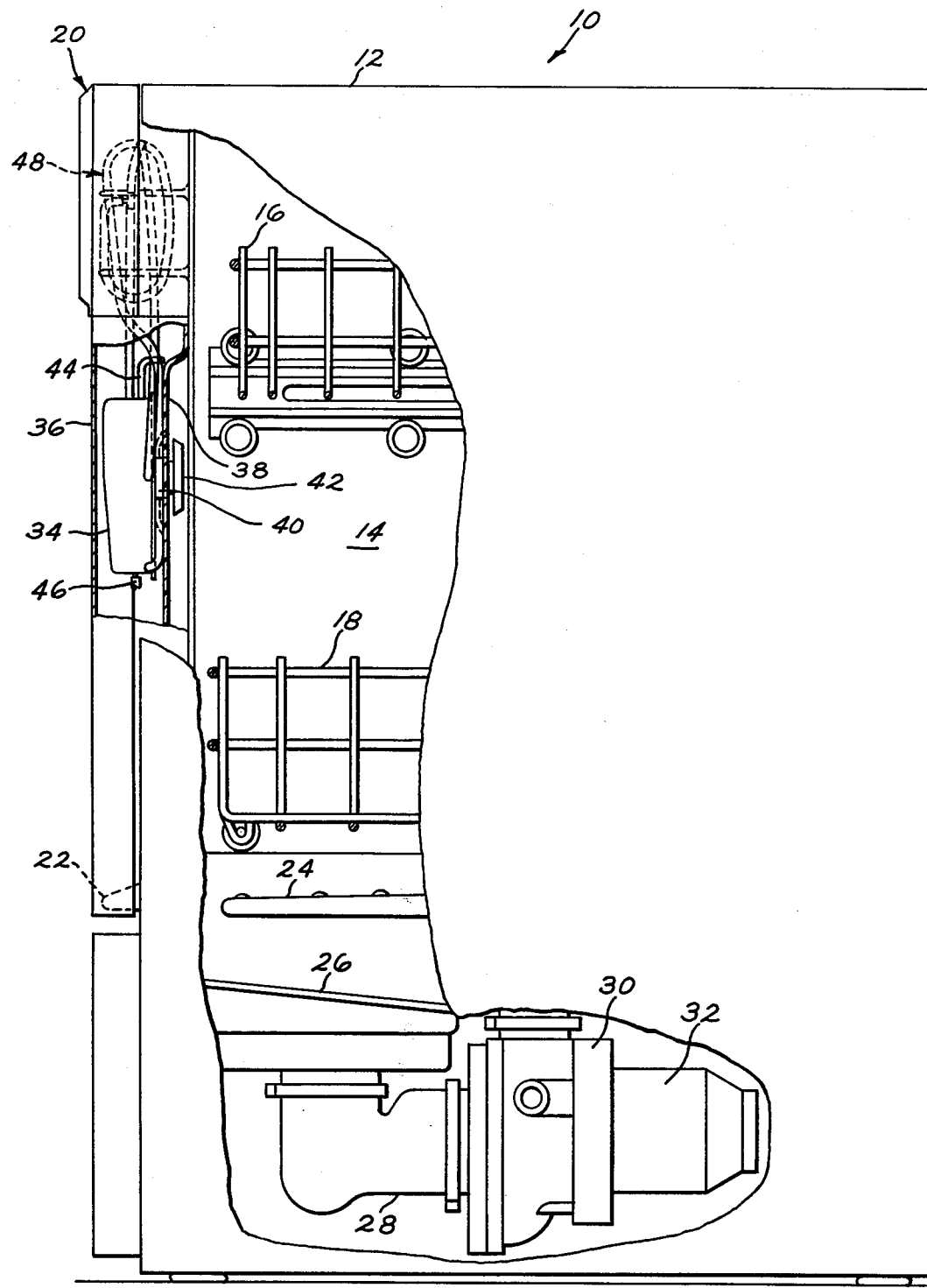
FIG. 1 is a side elevational view of a dishwasher shown in partial section with portions of the exterior cabinetry broken away to reveal the interior details including the installation of the indicator arrangement according to the present invention.

Referring to the drawings and particularly to FIG. 1, the liquid level indicating arrangement of the present invention is depicted incorporated in a dishwasher 10 of the front-loading type. Dishwasher 10 includes a dishwasher cabinet 12 defining an interior space 14 in which upper dish rack 16 and lower dish rack 18 are mounted so as to be movable in and out of the interior space 14 through a frontal opening, adapted to be closed off by an access door 20.

Access door 20 is movable between a first, closed position in which the access door 20 is vertically positioned and a second, open position in which access door 20 is tilted relative to said closed position. This second position is typically a horizontal or near-horizontal position. This opening movement is achieved by the access door 20 being swung down about pivots 22 to the vertically tilted open position in order to provide access to the interior space 14, and accommodate in and out movement of the upper dish rack 16 and lower dish rack 18 for loading.

Upper dish rack 16 and lower dish rack 18 are positioned above a rotary spray arm 24 which is adapted to direct a spray of wash and rinse water at the loaded dishware items during respective wash and rinse cycles.

The water is collected in a tub liner 26 and directed through a drain fitting 28 to the inlet of the circulation pump 30, driven by an electric motor 32.

The various details of the dishwashing machine are not here described inasmuch as the present invention does not concern such operating components, and such components are well known to those skilled in the art.

The liquid level indicating arrangement according to the present invention provides a visual indication of the level of liquid within a dispenser tank 34. Dispenser tank 34 is of the type adapted to dispense a rinse aid additive to the rinse water at an appropriate point in the rinse cycle. As in the dishwasher 10 shown in FIG. 1, such dispenser tanks are often mounted in the space between the outer panel 36 and the inner panel 38 of the access door 20.

A fill spout 40 is normally provided which protrudes through inner panel 38 with a filler cap 42 providing a closure for the fill opening through which the rinse additive is introduced. The details of the rinse aid dispenser mechanism are not here described, but typically include a vent tube 44 and a dispensing tube shown partially at 46 which communicates with an automatic dispensing device of conventional design.

The indicating arrangement according to the present invention includes a tubing network 48 positioned above the dispenser tank 34, having various sections thereof in communication with the tank interior in a manner to be described.

In the following description, various references will be made to "tubes", or "tubing", but it will of course be apparent that various forms of fluid passages could be employed.

Figure 2:
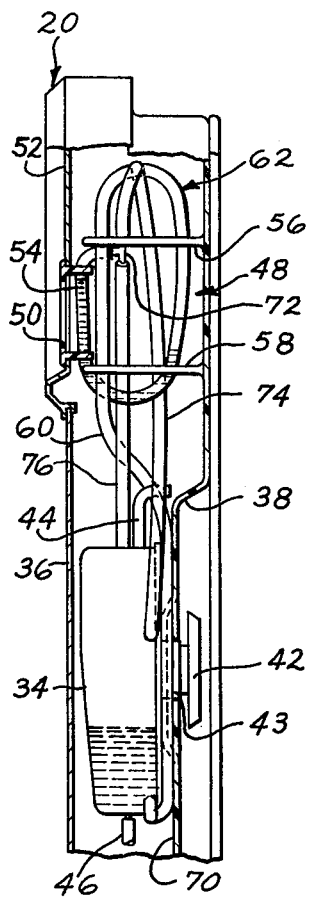
FIG. 2 is an enlarged elevational view of the portion of the door assembly depicted in the dishwasher of FIG. 1 showing the details of the rinse aid dispenser tank and associated level indicator arrangement.

Referring to FIG. 2, one section of the tubing is positioned adjacent the viewing opening 50 formed in the front control panel 52 mounted to the top of the access door 20. The viewing opening 50 may be comprised of a slot with a transparent indicator tube substantially occupying the viewing opening 50 and constituting a visual reference such as to provide a sight gage viewing means.

The indicator tube consists of an indicator leg 54 of a U-tube, to be described, which contains a colored indicator liquid which is caused to occupy indicator leg 54 at levels in correspondence with the level of liquid in the dispenser tank 34. This thus provides a sight glass type indication of the liquid level contained within the dispenser tank 34.

The entire tubing network 48 is supported on ribs 56 and 58 which may be molded integrally with inner panel 38 formed from a suitable plastic material.

Figure 3:
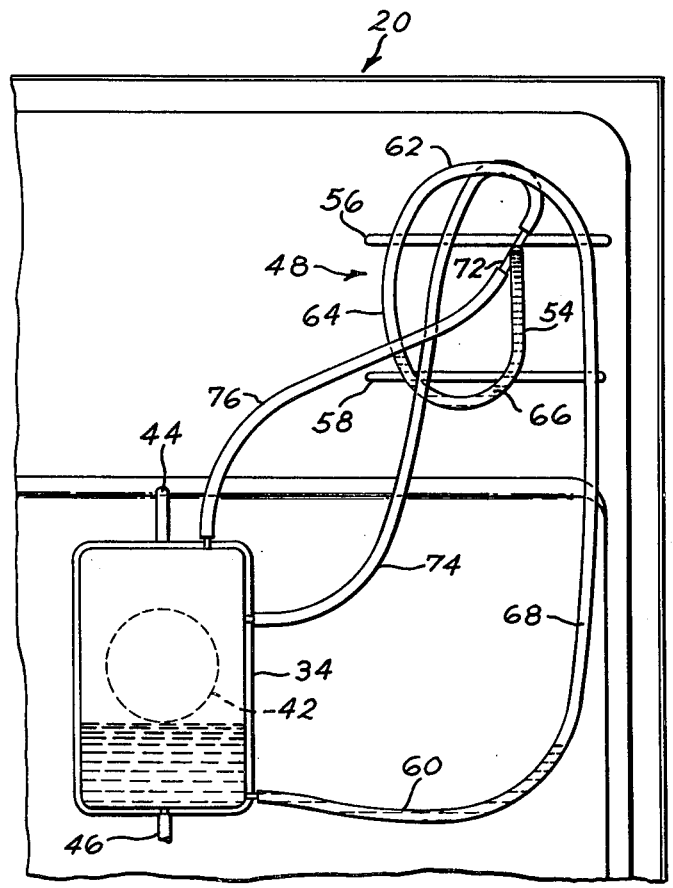
FIG. 3 is a front elevational view of the portion of the dishwasher arrangement depicted in FIG. 2 with the exterior paneling removed to depict the details of the indicator arrangement with portions of the tubes comprising the indicator system displaced out of the actual positions in order to reveal the functional relationship of the tubes to the system.

Referring to FIG. 3, the functional relationship of the various components of the tubing network 48 with each other and the dispenser tank 34 can be seen.

These components include a first section of tubing constituting an air column tube 60 which is in fluid communication with the lowermost region of the interior of the dispenser tank 34, and which has a first portion thereof adjacent the dispenser tank 34 extending generally horizontally a short distance away from the dispenser tank 34.

The air column tube 60 also has a second portion extending upwardly from the dispenser tank 34 and terminating in a reversely curved section. The reversely curved section extends in a generally vertical direction (with the door closed) and includes a U-tube 62 having a pair of vertically extending legs, with a first leg 64 and a second indicator leg 54 remote from the air column tube 60.

A quantity of an indicating liquid indicated at 66 is disposed in the U-tube 62 which tends to assume the condition shown in FIG. 3 in which the quantity of liquid is higher in indicator leg 54 than in leg 64 whenever liquid is present in the dispenser tank 34.

This condition is caused by the pressure exerted on the air in the air column tube 60 in the portion of the tube section indicated at 68, in which the air is compressed by the presence of rinse aid liquid forced into the lowermost region of the air column tube 60.

This pressure causes an equilibrium condition to be achieved in the U-tube 62 in which the pressure differential created by the difference in vertical height of the indicator liquid in the indicator leg 54 and the leg 64 is equal to the pressure head generated by the liquid in the dispenser tank 34.

The configuration of the tubes is arranged to produce the required condition, wherein when the level within the dispenser tank 34 is at a maximum, a volume of tank liquid is displaced into the air column tube 60 such that the indicator liquid in the U-tube is forced entirely up indicator leg 54 to thereby indicate a tank full condition, when viewed through the viewing opening 50.

Similarly, upon decline of the liquid level in the dispenser tank 34 to a substantially empty condition, the pressure in each leg of the U-tube 62 equalizes and the indicating liquid 66 retreats in the indicator leg 54 to the point whereat an empty condition is indicated, when the indicator leg 54 is viewed through the viewing window 50.

It will be appreciated by those skilled in the art that there is a relationship between the horizontal length of the portion of the air column tube 60 immediately adjacent the dispenser tank 34 and the effect of the volume of liquid in the tank on the indicator liquid in the U-tube when access door 20 is closed, and this length must be properly determined to insure full displacement of the indicator liquid with the liquid level in the dispenser tank 34 at maximum.

Referring again to FIGS. 2 and 4, the portion of the air column tube 60 adjacent dispenser tank 34 is also positioned flush against the interior surface 70 of the inner panel 38, and elevated above the dispenser tank 34 with the access door 20 open to thus extend downwardly towards the dispenser tank 34.

Figure 4:
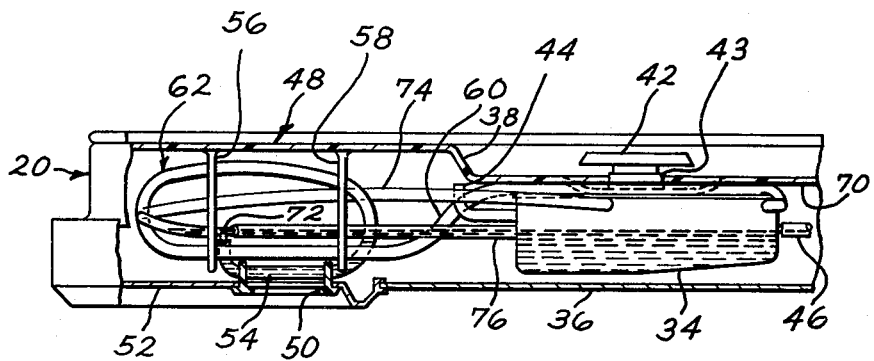
FIG. 4 is a side elevational view of the door portion shown in FIG. 2 swung to the horizontal or door open position.

The air column tube 60 enters the dispenser tank 34 in the upper region of the dispenser tank 34 (with the door open) as indicated in FIG. 4. The length of this elevated portion of tubing immediately adjacent the dispenser tank 34 is sufficient to insure that the volume of liquid passing into the air column tube 60 is entirely contained within this elevated portion. These relationships insure that the entire volume of rinse aid liquid displaced into the elevated portion of the air column tube 60 is drained back into the dispenser tank 34 upon opening of the door. Also, the location above the level of rinse aid liquid enables venting of the air in the air column tube 60 into the interior of dispenser tank 34.

Since the dispenser tank 34 is in turn vented to the atmosphere, the air column tube 60 is also vented with each opening and closing of the access door 20.

This venting enables periodic recalibration of the air column since the effect of varying temperatures and barometric pressures is thereby corrected with each door opening. That is, if the barometric pressure increases, the air column tube 60 will be slightly compressed so as to change the level of the liquid in the indicator leg 54. Similarly, temperature changes will vary the volume of air in the column, affecting the position of the indicator liquid.

The upper end of the indicator leg 54 is vented into the interior of the dispenser tank 34 in fluid communication, including a tee fitting 72 and two branching tube sections, an anti-siphon tube 74 and a fill and drain tube 76, each in fluid communication with the upper end of the indicator leg 54. The fill and drain tube 76 also acts to vent the upper end of the indicator leg 54 to enable free movement of the indicator liquid in response to the pressure developed in the air column tube 60.

The fill and drain tube 76 enters the dispenser tank 34 at the top, whereas the anti-siphon tube 74 enters the sidewall of the dispenser tank 34 at a point well above the maximum liquid level in the dispenser tank 34. This precludes the entry of liquid into the anti-siphon tube 74 by wave action occurring upon a rapid opening of the access door 20.

The anti-siphon tube 74 and fill and drain tube 76 constitute a means for enabling a calibrated volume of rinse aid liquid to be introduced into the U-tube 62, which is the proper volume for correct indicator action. In the initial installation of the dishwasher 10, the access door 20 is open as indicated in FIG. 4 and rinse aid liquid is introduced into the dispenser tank 34 until the rinse aid detergent just fills the indicator leg 54, entering via the fill and drain tube 76. This establishes the maximum volume of rinse aid liquid to be added to the dispenser tank 34. Upon repositioning of the access door 20 in a closed or vertical position, any excess rinse aid liquid in the fill and drain tube 76 drains back into the dispenser tank 34.

The vertical position of the tee fitting 72 with the access door 20 open is controlled so that the volume of liquid remaining in the U-tube 62 is appropriate to provide proper indicator action.

As rinse aid liquid is draining through the fill and drain tube 76, air enters behind it through the anti-siphon tube 74 to insure that the liquid will not be siphoned out of the U-tube 62 and back into the dispenser tank 34.

Thus, a calibrated volume of rinse aid liquid is introduced into the U-tube 62 by this relatively simple procedure. For subsequent fillings, rinse aid liquid is added to the dispenser tank 34 until the indicator leg 54 appears full in the viewing opening 50, with the access door 20 in the closed position.

It is noted that in FIG. 3, the tubes appear to be in a plane parallel to the access door 20. However, the tubes are only shown in this manner to indicate clearly the relationship of the various tubes and the actual physical positioning of the various tubes is as in FIG. 4, in which the U-tube 62 is positioned in a vertical plane behind the viewing opening 50. This positioning is for the purpose of controlling the movement into and out of the indicator leg 54, i.e., the fill and drain tube 76 is positioned vertically above the indicator leg 54 with the access door 20 in the open position. This precludes the escape of indicator liquid in the U-tube 62 by opening of the access door 20 after the initial fill with indicator liquid. The vertical level of the tee fitting 72 positions the terminal portion of the indicator leg 54 at a point which will always insure retention of the volume of liquid indicator therein.

This thereby provides a means for adapting the air column concept to a front-loading dishwasher.

Accordingly, it can be seen that the indicator arrangement according to the present invention achieves the above-recited objects in that the venting of the compressed air column is carried out periodically, i.e., at each opening and closing of the door, to substantially obviate the effects of varying temperature and barometric pressure conditions on the indicator performance, in effect automatically recalibrating this system with each door opening.

The arrangement is simple and trouble-free involving only low cost, easily installed components such as the relatively short lengths of tubing. Finally, a simple procedure and arrangement for introducing an indicator fluid by causing the rinse aid liquid to be introduced into the tubing network in such a way as to properly calibrate the system at the initial installation.

The embodiments of the invention in which an exclusive property or privilege is claimed are defined as follows:

1. A liquid level indicator for a tank, said tank being movably mounted to be alternately positioned in a first or second position, said second position vertically tilted from said first position, said indicator arrangement comprising:

an air column fluid passage in fluid communication with the lower region of the interior of said tank, with said tank in said first position, said air column fluid passage including a first portion extending generally horizontally away from said tank, and the portion thereof immediately adjacent said tank elevated with respect to said tank with said tank in said second position;

said air column fluid passage including a second portion extending upwardly from said tank and said first portion of said air column fluid passage with said tank in said first position;

a vertically reversely curved fluid passage section in fluid communication with said air column at a location remote from said tank with said reversely curved sections forming a U-tube disposed in a vertical position with said tank in said first position;

means for venting the upper end of the U-tube leg remote from said air column fluid passage;

means for venting said tank to the atmosphere;

viewing gage means associated with said remote leg of said U-tube;

a volume of indicator liquid retained in said U-tube;

whereby said remote leg acts as an indicator leg indicating the level of liquid in said tank by movement of said liquid into said first portion of said air column fluid passage by positioning of said tank in said first position, and the resulting compression of air in said air column fluid passage indicating liquid in said U-tube enabling liquid level indication by the position of indicating liquid in said indicator leg and in viewing of said liquid level by the aid of said viewing gage means.

2. The indicator arrangement according to claim 1 wherein said air column fluid passage enters into fluid communication with said tank at an upper point thereon of said tank in said second position to insure drainback of said liquid disposed in said air column fluid passage back into said tank upon movement of said tank from said first to said second position.

3. The indicator arrangement according to claim 1 further including a fill and drain fluid passage in fluid communication with an upper end of said remote leg of said U-tube, said fill and drain fluid passage being elevated above said remote leg of said U-tube with said tank in said second position, whereby liquid may be introduced into said U-tube to provide said volume of indicator liquid by filling of said tank with said tank in said second position, and further including an anti-siphon fluid passage in fluid communication with said fill and drain fluid passage and said remote leg of said U-tube, said anti-siphon fluid passage further in fluid communication with said tank in the upper region thereof above the liquid level in said tank, thereby precluding siphoning of said volume of indicator liquid when said tank is moved to said first position.

4. The indicator arrangement according to claim 3 wherein said anti-siphon fluid passage is connected to said tank through a side surface, with said tank in said first position, at a point above the level of liquid in said tank corresponding to the tank level with said tank in said second position and said U-tube just filled.

5. In a liquid level indicating arrangement of the type including a tank with the liquid level therein visually indicated, an air column fluid passage extending from said lower region of said tank interior and means for providing a visual indication of the level of liquid in said tank by the pressure developed in said air column fluid passage by liquid displaced from said tank and compressing an air column in said air column fluid passage, in combination:

means mounting said tank for movement between a first position and a second position, said liquid level in said tank being indicated by said indication means when said tank is in said first position;

means for venting an air space in said tank;

means for causing said liquid introduced into said air column fluid passage upon positioning said tank into said first position to drain back into a vented air space in said tank upon positioning said tank into said second position, whereby said air column fluid passage is vented thereby correcting for the effects of temperature and barometric pressure conditions upon each movement of said tank from said first to said second position.

6. In a liquid level indicating arrangement of the type including means for visually indicating the level in a tank movably mounted to be positioned in either a first or second position, said second position vertically tilted from said first position;

an air column fluid passage in communication with a lower region of the interior of said tank;

a U-tube in fluid communication with said air column fluid passage;

a volume of indicator liquid in said U-tube assuming differing levels in the respective legs of said U-tube section by pressure exerted by liquid in said tank acting through said air column fluid passage;

viewing gage means associated with the second leg of said U-tube remote from said air column fluid passage;

the improvement comprising:

means for introducing said indicator liquid from said tank, said means including a fill and drain fluid passage extending from said tank into said second leg of said U-tube;

an anti-siphon fluid passage in fluid communication with said fill and drain fluid passage and said second leg of said U-tube, said anti-siphon fluid passage also extending into said tank;

whereby indicating liquid may be introduced into said U-tube by movement of liquid in said tank through said fill and drain fluid passage into said U-tube by positioning of said tank in said second position vertically tilted from said first position, whereby said level in said tank is to be indicated, without siphoning said liquid in said U-tube back into said fill and drain fluid passage upon movement of said tank back to said first position.

7. A rinse aid tank indicator arrangement for a front-loading dishwasher of the type wherein a rinse aid tank is mounted in an access door of said dishwasher, said access door being mounted for opening movement from a first, generally vertical, closed position to a second, generally horizontal, open position, wherein said dispenser tank has a fill opening accessible with said access door in the open position, in combination:
- a liquid level indicator arrangement including an air column fluid passage extending from said rinse aid tank into fluid communication with a vertically reversely curved section forming, with said door closed, a vertically disposed transparent U-tube having a first leg in communication with said air column fluid passage and a second indicator leg remote from said air column fluid passage;
- a quantity of indicator liquid in said U-tube;
- viewing gage means associated with said indicator leg providing an indication of said indicator liquid level therein, whereby compression of the air in said air column fluid passage by liquid in said rinse aid tank causes said indicator liquid in said U-tube indicator leg to assume positions in correspondence thereto, whereby visual indication of said liquid level and said rinse aid detector is provided in said front access door;
- the terminal portion of said U-tube leg remote from said air column fluid passage extending vertically upward therefrom with said door in said open position, whereby indicator liquid introduced into said U-tube will be retained therein during opening and closing of said door.

8. The rinse aid tank indicator arrangement according to claim 7 further including means for venting said air column on each opening movement of said access door, said means including a portion of said air column fluid passage disposed extending generally horizontally from said tank, with said door in said closed position, said horizontally extending portion of said air column fluid passage including a portion inclined vertically upward from the tank with said door in said open position and extending for a distance sufficient to accommodate the entire volume of liquid displaced from said rinse aid tank with said rinse aid in said tank at a maximum level condition with said door in said closed position, whereby all of said displaced liquid in said air column fluid passage will drain back into said rinse aid tank upon movement of said door to said open position to thereby vent said air column fluid passage.

9. The rinse aid tank indicator arrangement according to claim 7 further including a fill and drain fluid passage in communication with said terminal portion of said indicator leg of said U-tube, an anti-siphon fluid passage in communication with the point whereat said fill and drain fluid passage is placed in communication with said terminal portion of said indicator leg of said U-tube, thereby allowing indicator liquid to be introduced into said U-tube from said tank by flow therein through said fill and drain fluid passage and the excess drained back into said tank upon said movement of said access door to said closed position, said anti-siphon fluid passage precluding the siphoning of indicator liquid out of said U-tube.

* * * * *